US010618817B2

(12) United States Patent
Meissner et al.

(10) Patent No.: US 10,618,817 B2
(45) Date of Patent: Apr. 14, 2020

(54) NH3 SYNTHESIS CONFIGURATION FOR LARGE-SCALE INSTALLATIONS

(71) Applicants: thyssenkrupp Industrial Solutions AG, Essen (DE); thyssenkrupp AG, Essen (DE)

(72) Inventors: Christoph Meissner, Dortmund (DE); Andreas Kinner, Recklinghausen (DE); Klaus Nölker, Dortmund (DE); Reinhard Heun, Herdecke (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/093,845

(22) PCT Filed: Apr. 13, 2017

(86) PCT No.: PCT/EP2017/058933
§ 371 (c)(1),
(2) Date: Oct. 15, 2018

(87) PCT Pub. No.: WO2017/182385
PCT Pub. Date: Oct. 26, 2017

(65) Prior Publication Data
US 2019/0106330 A1  Apr. 11, 2019

(30) Foreign Application Priority Data
Apr. 18, 2016 (DE) .................. 10 2016 107 124

(51) Int. Cl.
*C01C 1/04* (2006.01)
*B01J 8/04* (2006.01)

(52) U.S. Cl.
CPC .......... *C01C 1/0417* (2013.01); *B01J 8/0492* (2013.01); *B01J 8/0496* (2013.01);
(Continued)

(58) Field of Classification Search
CPC .......... B01J 2208/00168; B01J 2208/02; B01J 8/0492; B01J 8/0496; C01C 1/0417; Y02P 20/52
See application file for complete search history.

(56) References Cited

U.S. PATENT DOCUMENTS

| | | | |
|---|---|---|---|
| 5,352,428 A * | 10/1994 | Bhakta | B01J 8/043 422/148 |
| 7,683,099 B2 | 3/2010 | Hipp | |
| 2016/0251229 A1* | 9/2016 | Alkusayer | C25B 5/00 564/65 |

FOREIGN PATENT DOCUMENTS

| | | |
|---|---|---|
| DE | 225 029 A | 7/1985 |
| DE | 100 57 863 A | 5/2002 |

(Continued)

OTHER PUBLICATIONS

English Translation of International Search Report issued in PCT/EP2017/058933, dated Jun. 28, 2017 (dated Jul. 6, 2017).
(Continued)

*Primary Examiner* — Amber R Orlando
*Assistant Examiner* — Syed T Iqbal
(74) *Attorney, Agent, or Firm* — thyssenkrupp North America, Inc.

(57) ABSTRACT

A method and device for producing ammonia from a syngas in a heterogeneous gas catalysis process in at least two reaction devices connected in series. Each reaction device includes at least two catalyst beds through which the syngas is conducted and in which an at least partial conversion of the syngas into the product gas is carried out. At least one first heat exchanger is provided in the first reaction device, and the fresh syngas is pre-heated in the first heat exchanger. The syngas exiting the first catalyst bed and which includes the product and non-converted reactants is cooled before entering the second catalyst bed. According to an embodi-
(Continued)

ment of the invention, the pre-heating process is carried out in a first heat exchanger arranged between the first and the second catalyst bed. Thus, synthesis conversion can be increased without substantially increasing the process gas quantity.

8 Claims, 3 Drawing Sheets

(52) U.S. Cl.
CPC .. *B01J 2208/00168* (2013.01); *B01J 2208/02* (2013.01); *Y02P 20/52* (2015.11)

(56) References Cited

FOREIGN PATENT DOCUMENTS

| EP | 0 143 280 A | 6/1985 | |
|----|----|----|----|
| EP | 0 272 448 A | 6/1988 | |
| EP | 0272448 B1 * | 4/1991 | ............ B01J 8/0415 |
| WO | 2011/091930 A | 8/2011 | |

OTHER PUBLICATIONS

A. Nielsen, I. Dybkjaer, Ammonia—Catalysis and Manufacture, Springer Berlin 1995, Chapter 6, pp. 202-326.
Max Appl et al.: "Ammonia, 2. Production Processes" in "Ullmann's Encyclopedia of Industrial Chemistry", 2012.
Dennis Lippmann et al.: "Uhde dual-pressure process for large-scale ammonia plants", pp. 56-61, 2014.

* cited by examiner

NH3 SYNTHESIS CONFIGURATION FOR LARGE-SCALE INSTALLATIONS

CROSS REFERENCE TO RELATED APPLICATIONS

This application is a U.S. National Stage Entry of International Patent Application Serial Number PCT/EP2017/058933, filed Apr. 13, 2017, which claims priority to German Patent Application No. DE 10 2016 107 124.2, filed Apr. 18, 2016, the entire contents of both of which are incorporated herein by reference.

FIELD

The present disclosure generally relates to a process and to an apparatus for preparing ammonia from a synthesis gas under heterogeneous gas catalysis in at least two series-connected reaction apparatuses.

BACKGROUND

A number of products in the commodity chemicals industry, for example ammonia or methanol, are synthesized in gas catalysis on the industrial scale using fixed bed catalysts. The syntheses generally proceed with decreasing volume at very high working pressures at high working temperatures.

In the production of ammonia, the synthesis gas comprises hydrogen and nitrogen and optionally additionally inert gases such as methane and/or noble gases. In this process, the fresh synthesis gas is typically first compressed to a high pressure and the compressed synthesis gas is fed into a circuit which is guided through one or more catalyst-filled reactors in which ammonia is produced. A separation system has typically been provided in the circuit, with which the ammonia produced is withdrawn from the circuit in liquid form.

In industrial practice, large-scale syntheses that are typically executed as circulation syntheses, in the design as single-stream plants, however, are increasingly meeting limitations as a result of apparatuses, machines and pipelines. Proceeding, for example, from a maximum permissible working pressure of about 230 bara in the ammonia synthesis, economically viable construction limits for pressure vessels and pipelines are foreseeable. If the intention is to further increase the capacity of circulation syntheses without increasing the number of pressure apparatuses, technological alterations are necessary.

The ammonia formation reaction is a pronounced equilibrium reaction, the equilibrium position of which moves ever more to the side of the reactants with increasing temperature. In the region of the customary working temperatures for the catalyst beds and working pressures of about 200 bar, only ammonia equilibrium concentrations of 20-25% are achieved. According to the Le Chatelier principle, increasing the working pressure can move the equilibrium position toward higher ammonia concentrations. However, tight limits are placed on any increase in the synthesis pressure by the available compressors. Furthermore, the additional compressor work has an adverse effect on the process efficiency, and the higher working pressure results in greater wall thicknesses for the apparatuses and hence specifically higher production costs.

The ammonia formation reaction is highly exothermic, and so the temperature of the process gas as it passes through the catalyst bed increases constantly if no removal of heat is being undertaken. Ammonia synthesis converters with internal bed cooling have been proposed and indeed implemented in individual cases. However, they are a complex construction and correspondingly costly to manufacture. Moreover, the filling and withdrawal of the catalyst is much more complex than in the case of reactors without cooling internals in the beds.

Therefore the economic optimum has for several decades been considered to be the division of the total amount of catalyst between three individual beds and the re-cooling of the process gas by heat exchangers situated between the beds.

Various solutions have been proposed to date for increasing the capacity of existing plants in particular.

DE 100 57 863 A1 discloses a process for preparing ammonia from synthesis gas which, apart from the hydrogen and nitrogen reactants, contains inert constituents in at least two reaction systems, wherein ammonia is synthesized successively from synthesis gas in different synthesis systems, where ammonia is produced from a portion of the synthesis gas in each of the synthesis systems and a portion thereof is discharged.

DD 225 029 relates to a process for synthesizing ammonia from synthesis gas containing inert materials, which is characterized by the use of two reaction systems. In the first reaction system, fresh synthesis gas only is converted. The unconverted synthesis gas is guided together with the gas from a synthesis circuit to the second reaction system, where the further conversion to ammonia is effected.

It is also part of the prior art that, for energy reasons, the waste heat from the reaction is utilized immediately downstream of the ammonia reactor for production of steam or for boiler feed water preheating. The waste heat rises with the amount of ammonia produced and the circulation volume in the synthesis circuit.

U.S. Pat. No. 5,352,428 A discloses a process for preparing ammonia having two series-connected reaction apparatuses each comprising two catalyst beds. In this known process, the product gas stream is cooled down by means of a quench gas stream downstream of the first catalyst bed, through which a substream of the fresh feed gas is passed directly to the second catalyst bed. This measure leads to a reduced yield of product gas, since this quench gas stream used for cooling does not take part in the reaction in the first catalyst bed.

U.S. Pat. No. 7,683,099 B2 describes processes for conducting exothermic gas phase reactions with heterogeneous catalysis, in which two reaction apparatuses having a total of three catalyst beds are used, wherein two catalyst beds are disposed in one of the reaction apparatuses. This document also describes a variant in which a substream of the product gas, after passing through the second catalyst bed, is separated off and cooled significantly, and the ammonia is condensed out as product and removed from the plant. A substream of the highly cooled gas is then passed into a second reaction apparatus in which there is a third catalyst bed. A disadvantage of this procedure is, however, that the gas has to be heated up again before being introduced into the third catalyst bed in order to start the reaction, and so thermal energy is lost. Moreover, the capital costs for this variant are much higher, since the cooling and heating require additional equipment. Thus, the process according to U.S. Pat. No. 7,683,099 B2 is comparatively uneconomic.

However, the known processes and apparatuses for preparation of a product from synthesis gas are not satisfactory in every aspect, particularly owing to the increase in the number of pressure apparatuses for large-scale plants, and so there is a need for improved processes and apparatuses.

Thus a need exists for an advantageous process and an advantageous apparatus for preparation of ammonia from a synthesis gas, having the features stated at the outset.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a process and to an apparatus for preparing ammonia from a synthesis gas under heterogeneous gas catalysis in at least two series-connected reaction apparatuses, where each of these reaction apparatuses comprises at least two catalyst beds through which the synthesis gas is passed and in which there is at least partial conversion to product gas, where at least one first heat exchanger has been provided in the first reaction apparatus, in which the fresh synthesis gas A is preheated, and where cooling of the synthesis gas B comprising product and unconverted reactants that exits from the first catalyst bed is provided prior to entry into the second catalyst bed.

According to the invention, the fresh synthesis gas A is preheated in a first heat exchanger disposed between the first catalyst bed and the second catalyst bed.

The achievement of the object in accordance with the invention has the particular advantage that the waste heat from the first catalyst bed can be used for the preheating of the fresh synthesis gas, and hence the disadvantages of the quench stream that exists in U.S. Pat. No. 5,352,428 are avoided. The conversion in the synthesis can thus be increased without significantly raising the process gas volume and with the same catalyst volume.

In the case of the inventive division of the catalyst beds into two separate reaction apparatuses, preferably pressure vessels, it is additionally also possible to divide a steam-raising operation between two apparatuses.

Preferably, in the process of the invention, synthesis gas B leaving the first catalyst bed, prior to entry into the second catalyst bed, is cooled by means of the first heat exchanger which is disposed between the first catalyst bed and the second catalyst bed in the flow pathway with respect to the synthesis gas B comprising a proportion of product.

More preferably, in a development of the achievement of the object in accordance with the invention, the entire feed gas stream of the fresh synthesis gas A is passed through the first catalyst bed and then also through the second catalyst bed. This has the advantage that the entire feed gas stream of the fresh synthesis gas takes part in the reaction in both catalyst beds of the first reaction apparatus. By contrast, the branching-off of a quench gas stream for the cooling of the synthesis gas stream B after the first catalyst bed, as envisaged in the prior art, leads to a loss of yield since this proportion is not passed through the first catalyst bed.

In a further advantageous development of the invention, an intermediate heat exchanger (2-1) disposed in the flow pathway between the first reaction apparatus (1) and the second reaction apparatus (3) has been provided and the hot product gas stream leaving the second catalyst bed (1-B) is utilized for raising of steam in the intermediate heat exchanger (2-1) without prior cooling. By virtue of this measure, all the heat energy present in the hot product gas stream is utilized for raising of steam, and so a greater amount of steam can be raised.

In a further advantageous development of the aforementioned variant of the invention, process gas stream D is cooled in the intermediate heat exchanger (2-1) below the entry temperature required for a downstream third catalyst bed (3-A), and optionally also below the temperature of the steam raised for the greatest possible utilization of the energy in stream D, in order, in a subsequent step, with the aid of a further heat exchanger (3-2) which simultaneously serves as intermediate cooler between the third catalyst bed and a fourth catalyst bed, to bring the process gas stream back to a defined optimal process temperature for the catalyst bed (3-B). This enables optimal temperature control over all catalyst beds.

The process of the invention for preparation of ammonia may comprise the following steps, for example:
  a. providing a fresh synthesis gas A comprising reactants and optionally inert components;
  b. synthesizing product from reactants present in synthesis gas A under heterogeneous gas catalysis in a first reaction apparatus (1), comprising the steps of:
     $b_1$) optionally heating the fresh synthesis gas A in a first preliminary heat exchanger (1-1);
     $b_2$) heating the fresh synthesis gas A in a first heat exchanger (1-2);
     $b_3$) passing the fresh synthesis gas A through a first catalyst bed (1-A) to form a synthesis gas B comprising product and unconverted reactants;
     $b_4$) cooling synthesis gas B in the first heat exchanger (1-2);
     $b_5$) passing synthesis gas B through a second catalyst bed (1-B) to form a synthesis gas C comprising product and unconverted reactants;
     $b_6$) optionally cooling synthesis gas C in a second heat exchanger (1-3) or in the first preliminary heat exchanger (1-1); and passing synthesis gas C through a third catalyst bed (1-C) to form a synthesis gas D comprising product and unconverted reactants;
     $b_7$) discharging synthesis gas D from the first reaction apparatus (1);
  c. cooling at least a portion of synthesis gas D in a first intermediate heat exchanger (2-1); optionally cooling at least a portion of synthesis gas D in a second intermediate heat exchanger (2-2);
  d. synthesizing product from reactants present in synthesis gas D under heterogeneous gas catalysis in a second reaction apparatus (3), comprising the steps of:

d₁) optionally preheating synthesis gas E in a second preliminary heat exchanger (3-1);
d₂) heating synthesis gas E in a third heat exchanger (3-2);
d₃) passing synthesis gas E through a third catalyst bed (3-A) to form a synthesis gas E comprising product and unconverted reactants;
d₄) cooling synthesis gas F in the third heat exchanger (3-2);
d₅) passing synthesis gas F through a fourth catalyst bed (3-B) to form a synthesis gas F comprising product and unconverted reactants;
d₆) optionally cooling synthesis gas G in a fourth heat exchanger (3-3) or in the second preliminary heat exchanger (3-1); and passing synthesis gas G through a further catalyst bed (3-C) to form a synthesis gas H comprising product and unconverted reactants;
d₇) discharging synthesis gas H from the second reaction apparatus (3); and
e) cooling at least a portion of synthesis gas H in a first downstream heat exchanger (4-1); and optionally cooling at least a portion of synthesis gas H in a second downstream heat exchanger (4-2).

Preferably, in step c), synthesis gas D leaves the intermediate heat exchanger (2-1) at a temperature $T_A$; and, in step d₃), synthesis gas E enters the third catalyst bed (3-A) at a temperature $T_E$; where the temperature $T_E$ is at least 30° C., preferably at least 50° C., greater than the temperature $T_A$. This temperature differential is then optionally compensated for by preheating in step d₁) and heating in step d₂). Preferably, $T_E$ in this case is in the range from 360° C. to 430° C., preferably in the range from 380° C. to 420° C.

It has been found that, surprisingly, this cooling of the synthesis gas between the first reaction apparatus and the second reaction apparatus enables significantly better convergence with the equilibrium curve of the ammonia formation reaction than is the case in conventional apparatuses where three catalyst beds are frequently disposed in a single reaction apparatus which also serves as a common pressure vessel.

An enlarged intermediate cooler takes more heat from the process gas, which can then be utilized for boiler feed water preheating and/or steam production. Reheating of the process gas in a further heat exchanger re-establishes the optimal entry temperature into the downstream catalyst bed. The gas entering the third catalyst bed can in turn be used to cool the process gas exiting from the third catalyst bed. In this way, it is also possible to optimize the entry temperature for the downstream fourth catalyst bed, which results in an increased conversion.

It has been found that, surprisingly, the extra costs for any necessary enlargement of the intermediate cooler and the introduction of intermediate cooling into the second reaction apparatus are smaller than the costs for additional catalyst in order to achieve the same conversion without intermediate cooling. This makes the process of the invention less costly than the current prior art.

Preferably, the reactants in the fresh synthesis gas A comprise hydrogen and nitrogen in a molar ratio of 2.0-4.0:1.0.

Synthesis gas E is cooled down in the third heat exchanger (3-2) in order to achieve a higher conversion in the fourth catalyst bed (3-B). The heat removed from synthesis gas F in the third heat exchanger is supplied to synthesis gas E. In order to achieve optimal inlet temperature into the third catalyst bed, synthesis gas D has to be cooled down further in the first intermediate heat exchanger than in previous concepts. The greater cooling of synthesis gas D makes it possible to raise more steam in the first intermediate heat exchanger, which increases the energy efficiency of the process overall.

Through suitable choice of the reaction conditions and the division of the catalyst volume, it is possible to distribute the amount of heat approximately equally between the two steam-raising apparatuses (2-1 and 4-1). It is thus possible to avoid restriction of the maximum size of new plants by the steam-raising apparatuses.

In step (a) of the process of the invention, a fresh synthesis gas A comprising reactants and optionally inert components is provided. The inert components here are inert with respect to the synthesis of the product. The composition of the fresh synthesis gas A is dependent on the type of product. In the case of the preferred ammonia product, the inert components preferably include noble gases, especially argon, and hydrocarbons, especially methane. The fresh synthesis gas A may come from different sources, natural gas being a preferred source. For details of the provision of synthesis gas, reference is made in full, for example, to A. Nielsen, I. Dybkjaer, *Ammonia—Catalysis and Manufacture*, Springer Berlin 1995, chapter 6, pages 202-326.

In a preferred embodiment, the fresh synthesis gas A provided in step (a) is prepared by reforming of hydrocarbons, where the reforming is effected in a steam reformer, in a gas-heated reformer, in an autothermal reformer or by partial oxidation, or the fresh synthesis gas A is prepared by electrolysis of water and air fractionation. Preference is given to using natural gas, water in the form of steam and air or oxygen in the reforming. The main constituent of the synthesis gas by volume is preferably hydrogen, where the nitrogen content may optionally also be relatively high, depending on whether air, oxygen-enriched air or even pure oxygen has been used in the preparation.

The fresh synthesis gas A provided in step (a) may already have been subjected to conventional processing measures, for example removal of helium, natural gas desulfurization, conversion of carbon monoxide to carbon dioxide, and removal of carbon dioxide. Even after conducting these processing measures, the fresh synthesis gas A may comprise not only hydrogen and nitrogen but optionally further components, especially inert components.

Synthesis gas A may preferably be fresh, meaning that, preferably in accordance with the invention, it may not have been previously discharged as purge gas stream from any upstream circulation synthesis.

The fresh synthesis gas A provided in step (a) may optionally already have been compressed, preferably to a pressure in the range from 50 to 400 bara, more preferably to a pressure in the range from 170 to 230 bara. Likewise preferably, the fresh synthesis gas A provided in step (a) is compressed in one or more suitable compressors to a pressure in the range from 50 to 400 bara, more preferably to a pressure in the range from 170 to 230 bara.

In step (b) of the process of the invention, product is synthesized from reactants present in synthesis gas A under heterogeneous gas catalysis in a first reaction apparatus comprising the following steps, for example:
b₁) optionally preheating the fresh synthesis gas A in a first preliminary heat exchanger (1-1);
b₂) heating the fresh synthesis gas A in a first heat exchanger (1-2);
b₃) passing the fresh synthesis gas A through a first catalyst bed (1-A) to form a synthesis gas B comprising product and unconverted reactants;
b₄) cooling synthesis gas B in the first heat exchanger (1-2);

b₅) passing synthesis gas B through a second catalyst bed (1-B) to form a synthesis gas C comprising product and unconverted reactants;

b₆) optionally cooling synthesis gas C in a second heat exchanger (1-3) or in the first preliminary heat exchanger (1-1); and passing synthesis gas C through a third catalyst bed (1-C) to form a synthesis gas D comprising product and unconverted reactants; and b₇) discharging synthesis gas D from the first reaction apparatus (1).

The technology for the synthesis is dependent on the type of product. Reactors and catalysts for gas phase reaction at high pressure under heterogeneous gas catalysis are known to a person skilled in the art. With regard to the synthesis of ammonia as product, which is preferred in accordance with the invention, reference is likewise made in full, for example, to A. Nielsen, I. Dybkjaer, *Ammonia—Catalysis and Manufacture*, Springer Berlin 1995, chapter 6, pages 202-326.

Preferably, the synthesis of product in step (b) is effected in a single reaction apparatus (1), preferably in the form of a pressure vessel. The fresh synthesis gas A is preferably introduced into the reaction apparatus (1) at the top end. After being introduced into the reaction apparatus, the fresh synthesis gas A is heated in a first heat exchanger (1-2) and optionally beforehand optionally in a first preliminary heat exchanger (1-1), preferably by at least 20° C., more preferably by at least 40° C.

Subsequently, the fresh synthesis gas A is passed through a first catalyst bed (1-A) to form a synthesis gas B comprising product and unconverted reactants. Preferably, the fresh synthesis gas A flows predominantly radially through the first catalyst bed (1-A), preferably from the outside inward, which reduces thermal stress on the pressure vessel. The choice of catalyst depends on the type of product. With regard to the synthesis of ammonia as product which is preferred in accordance with the invention, suitable examples are magnetite catalysts or ruthenium catalysts, which may optionally be admixed with further components.

Subsequently, synthesis gas B is cooled in the first heat exchanger (1-2), preferably by at least 20° C., more preferably by at least 40° C. Preferably, at least some of the heat from synthesis gas B is transferred here to the fresh synthesis gas A. The nature of the first heat exchanger (1-2) is not restricted in accordance with the invention. In a preferred embodiment, the first heat exchanger (1-2) takes the form of a straight-tube heat exchanger with a central tube. A straight-tube heat exchanger is one design of a shell and tube heat exchanger. In straight-tube heat exchangers, many thin individual tubes are guided in a straight line through a large tube. It can be operated either by the cocurrent principle or by the countercurrent principle. The straight-tube heat exchanger is particularly characterized in that it generates only a very small pressure drop in operation.

Preferably in accordance with the invention,
  i. any first preliminary heat exchanger (1-1) present; and/or
  ii. the first heat exchanger (1-2); and/or
  iii. any second heat exchanger (1-3) present; and/or
  iv. the first intermediate heat exchanger (2-1); and/or
  v. any second preliminary heat exchanger (3-1) present; and/or
  vi. the third heat exchanger (3-2); and/or
  vii. any fourth heat exchanger (3-3) present; and/or
  viii. the first downstream heat exchanger (4-1),
    each independently take the form of a straight-tube, U-tube or plate heat exchanger.

Subsequently, synthesis gas B is passed through a second catalyst bed (1-B) to form a synthesis gas C comprising product and unconverted reactants. Synthesis gas B preferably flows predominantly radially through the second catalyst bed (1-B), preferably from the outside inward. The choice of catalyst depends on the type of product. With regard to the synthesis of ammonia as product, which is preferred in accordance with the invention, examples of suitable catalysts are magnetite catalysts or ruthenium catalysts, which may optionally be admixed with further components.

In one possible embodiment, synthesis gas C is then passed through a third catalyst bed (1-C) to form a synthesis gas D comprising product and unconverted reactants. Preferably, synthesis gas C flows predominantly radially through the third catalyst bed (1-C), preferably from the outside inward. The choice of catalyst depends on the type of product. With regard to the synthesis of ammonia as product, which is preferred in accordance with the invention, examples of suitable catalysts are magnetite catalysts or ruthenium catalysts, which may optionally be admixed with further components.

If a first preliminary heat exchanger (1-1) is used in the process of the invention, it is preferably also used in step b₆) to cool synthesis gas D.

The first catalyst bed (1-A), the second catalyst bed (1-B) and any third catalyst bed (1-C) present are disposed in the first reaction apparatus (1) and are preferably arranged one on top of another, with the first catalyst bed (1-A) preferably arranged above the second catalyst bed (1-B), which is in turn preferably arranged above any third catalyst bed (1-C) present.

Synthesis gas D is preferably discharged from the first reaction apparatus (1) at the bottom end.

In step (c) of the process of the invention, preferably at least a portion of synthesis gas D is cooled in a first intermediate heat exchanger (2-1). Preferably at least 50% by volume of synthesis gas D is cooled in the first intermediate heat exchanger (2-1), more preferably at least 60% by volume, at least 70% by volume, at least 80% by volume or at least 90% by volume. Preferably at least a portion of synthesis gas D in step (c) is cooled by at least 20° C., more preferably by at least 30° C., at least 40° C., at least 50° C., at least 60° C., at least 80° C. or at least 100° C.

The cooling is required in order to be able to establish the entry temperatures, suitable for the subsequent step (d), of synthesis gas D into the third, fourth and any further catalyst beds present (3-A, 3-B and optionally 3-C) with the aid of the third heat exchanger (3-2). This temperature differential is optionally compensated for by preheating in step d₁) and heating in step d₂). Higher conversions or plant capacities would thus not be achievable in a cost-efficient manner without this step.

In one possible embodiment, a second intermediate heat exchanger is connected downstream of the first intermediate heat exchanger (2-1).

In step (d) of the process of the invention, product is synthesized from reactants present in synthesis gas D under heterogeneous gas catalysis in a second reaction apparatus, comprising the steps of:

d₁) optionally preheating synthesis gas E in a second preliminary heat exchanger;

d₂) heating synthesis gas E in a third heat exchanger;

d₃) conducting synthesis gas E through a third catalyst bed to form a synthesis gas F comprising product and unconverted reactants;

d₄) cooling synthesis gas F in the third heat exchanger;

d₅) passing synthesis gas F through a fourth catalyst bed to form a synthesis gas G comprising product and unconverted reactants;

d₆) optionally cooling synthesis gas G in a fourth heat exchanger or in the second preliminary heat exchanger and passing synthesis gas G through a further catalyst bed to form a synthesis gas H comprising product and unconverted reactants; and d₇) discharging synthesis gas H from the second reaction apparatus.

Preferably, the synthesis of product in step (d) is effected in a single reaction apparatus (3) which preferably takes the form of a pressure vessel. Synthesis gas E is preferably introduced into the second reaction apparatus (3) at the top end. After being introduced into the second reaction apparatus, synthesis gas E is heated in a third heat exchanger (3-2), preferably by at least 20° C., more preferably by at least 40° C.

Subsequently, synthesis gas E is passed through a third catalyst bed to form a synthesis gas F comprising product and unconverted reactants. Preferably, synthesis gas E flows predominantly radially through the third catalyst bed (3-A), preferably from the outside inward. The choice of catalyst depends on the type of product. With regard to the synthesis of ammonia as product, which is preferred in accordance with the invention, examples of suitable catalysts are magnetite catalysts or ruthenium catalysts, which may optionally be admixed with further components.

Subsequently, synthesis gas F is cooled in the third heat exchanger (3-2), preferably by at least 20° C., more preferably by at least 40° C. Preferably, at least some of the heat from synthesis gas F is transferred here to synthesis gas E. The nature of the third heat exchanger (3-2) is not restricted in accordance with the invention. In a preferred embodiment, the third heat exchanger takes the form of a straight-tube heat exchanger with a central tube.

Subsequently, synthesis gas F is passed through a fourth catalyst bed (3-B) to form a synthesis gas G comprising product and unconverted reactants. Preferably, synthesis gas F flows predominantly radially through the fourth catalyst bed (3-B), preferably from the outside inward. The choice of catalyst depends on the type of product. With regard to the synthesis of ammonia as product, which is preferred in accordance with the invention, examples of suitable catalysts are magnetite catalysts or ruthenium catalysts, which may optionally be admixed with further components.

In a preferred embodiment, synthesis gas G is then passed through at least one further catalyst bed (3-C) to form a synthesis gas H comprising product and unconverted reactants. Preferably, synthesis gas G flows predominantly radially through the further catalyst bed, preferably from the outside inward. The choice of catalyst depends on the type of product. With regard to the synthesis of ammonia as product, which is preferred in accordance with the invention, examples of suitable catalysts are magnetite catalysts or ruthenium catalysts, which may optionally be admixed with further components.

If a second preliminary heat exchanger is used in the process of the invention, it is preferably also used in step d₆) for cooling of synthesis gas G.

The third catalyst bed (3-A), the fourth catalyst bed (3-B) and any further catalyst bed (3-C) present are disposed in the second reaction apparatus (3) and are preferably arranged one on top of another, where the third catalyst bed (3-A) is preferably arranged above the fourth catalyst bed (3-B), which in turn is preferably arranged above any further catalyst bed (3-C) present.

Synthesis gas H is preferably discharged from the second reaction apparatus (3) at the bottom end.

In step (e) of the process of the invention, at least a portion of the synthesis gas H is cooled in a first downstream heat exchanger (4-1). Preferably at least 50% by volume of the synthesis gas H is cooled in the first downstream heat exchanger, more preferably at least 60% by volume, at least 70% by volume, at least 80% by volume or at least 90% by volume. Preferably at least a portion of the synthesis gas H is cooled in step (e) by at least 20° C., more preferably by at least 30° C., at least 40° C., at least 50° C., at least 60° C., at least 80° C. or at least 100° C.

In a preferred embodiment, a second downstream heat exchanger is connected downstream of the first downstream heat exchanger (4-1).

In a preferred embodiment, the heat removed in the
first intermediate heat exchanger (2-1) and any second intermediate heat exchanger present; and/or
in the first downstream heat exchanger (4-1) and any second downstream heat exchanger present
is preferably used to form steam, and the steam, preferably high-pressure steam, can be used either in the process of the invention or in any other process.

Preferably, water that has preferably been heated beforehand is introduced into the
first intermediate heat exchanger (2-1) and any second intermediate heat exchanger present; and/or
in the first downstream heat exchanger (4-1) and any second downstream heat exchanger present.

Preference is given to introducing water and/or steam which has been heated beforehand to a temperature in the range from 20 to 220° C., more preferably to a temperature in the range from 140 to 220° C. In a preferred embodiment, at least a portion of synthesis gas D is cooled in the first intermediate heat exchanger (2-1) and/or at least a portion of the synthesis gas H is cooled in the first downstream heat exchanger (4-1) by at least 50° C., more preferably by at least 70° C., at least 90° C. or at least 100° C.

In a preferred embodiment, after step (e), at least a portion of the synthesis gas H is circulated and mixed with the fresh synthesis gas A provided in step (a). Preferably, after step (e), at least 50% by volume of the synthesis gas F or G is circulated, more preferably at least 60% by volume, at least 70% by volume, at least 80% by volume or at least 90% by volume. The circulation of at least a portion of the synthesis gas H forms a synthesis circuit in which any inert components can accumulate. However, too high a proportion of inert components in the synthesis gas is disadvantageous since this reduces the partial pressure of the reactants and hence the yield of product. Preferably, the proportion of the synthesis gas H which is circulated is chosen such that the proportion of inert components in the synthesis circuit is at most 20% by volume, more preferably at most 15% by volume.

In a preferred development of the invention, at least one further heat exchanger (3-2), through which the synthesis gas that enters the third catalyst bed (3-A) flows in order to preheat it, is disposed in the second reaction apparatus (3) between the third catalyst bed (3-A) and the fourth catalyst bed (3-B), and this further heat exchanger (3-2) simultaneously serves to cool down the synthesis gas F entering the fourth catalyst bed (3-B).

In the process of the invention, lower circulation rates in the synthesis circuit can be achieved, and consequently it is possible thereby to have a smaller overall design of the apparatus for production of a product, or to achieve a higher conversion with the same size. Owing to the additional preheating of synthesis gas E in the third heat exchanger (3-2) of the second reaction apparatus (3) and any second preliminary heat exchanger present, it is possible to cool synthesis gas E further in the first intermediate heat exchanger (2-1) after exit from the first reaction apparatus (1) than is customary in conventional processes.

It is thus possible in the process of the invention, by comparison with conventional processes, to raise more steam which can be used in the process of the invention or in any other process. Moreover, additional intermediate cooling operations make it possible to achieve higher conversions without increasing the total amount of catalyst.

The prior art is that four catalyst beds are likewise installed, but generally without intermediate cooling for steam raising and/or for boiler feed water preheating. The variant without intermediate cooling for steam-raising is generally less energy-efficient than with intermediate cooling.

In a preferred embodiment, the synthesis is effected on a scale that exceeds a daily production of at least 1800 t of product, more preferably a daily production of at least 2500 t of product or of at least 3000 t of product.

A further aspect of the invention relates to an apparatus for preparation of ammonia from a synthesis gas A under heterogeneous gas catalysis, especially for use in a process of the type described above, wherein the apparatus comprises the following components that are functionally connected to one another:

a first reaction apparatus (1) comprising:
c. a first catalyst bed (1-A) configured to form a synthesis gas B comprising product and unconverted reactants from a fresh synthesis gas A;
d. a first heat exchanger (1-2) configured to heat the fresh synthesis gas A before entry into the first catalyst bed (1-A) and to cool a synthesis gas B after exit from the first catalyst bed (1-A);
e. a second catalyst bed (1-B) configured to form a synthesis gas D comprising product and unconverted reactants from the synthesis gas B;
f. means configured to discharge synthesis gas D from the first reaction apparatus (1);
an intermediate heat exchanger (2-1) configured to cool at least a portion of the synthesis gas D.
A second reaction apparatus (3) comprising:
g. a third catalyst bed (3-A) configured to form a synthesis gas F comprising product and unconverted reactants from synthesis gas E;
h. a third heat exchanger (3-2) configured to heat the synthesis gas E before entry into the third catalyst bed (3-A) and to cool the synthesis gas F after exit from the third catalyst bed (3-A);
i. a fourth catalyst bed (3-B) configured to form a synthesis gas H comprising product and unconverted reactants from synthesis gas F;
j. means configured to discharge synthesis gas H from the second reaction apparatus (3); and
a downstream heat exchanger (4-1) configured to cool at least a portion of the synthesis gas H, wherein, in accordance with the invention, the first heat exchanger (3-2) is in a concentric radial arrangement within the first catalyst bed (3-A) and/or the third heat exchanger (3-3) is in a concentric radial arrangement within the third catalyst bed (3-B).

The components of the apparatus of the invention are functionally connected to one another, meaning that they are connected to one another by suitable pipelines etc. in such a way as to ensure that the apparatus is generally capable of functioning. The measures required for the purpose are known to a person skilled in the art.

All preferred embodiments that have been described above in connection with the process of the invention for preparation of a product are also applicable analogously to the apparatus of the invention for preparation of a product and will therefore not be repeated.

The first reaction apparatus (1) and/or the second reaction apparatus (3) preferably comprises an essentially cylindrical vessel with a vertical longitudinal axis. Reactors for gas phase reaction at high pressure are known to a person skilled in the art. With regard to the inventive synthesis of ammonia, reference is made, for example, to A. Nielsen, I. Dybkjaer, *Ammonia—Catalysis and Manufacture,* Springer Berlin 1995, chapter 6, pages 202-326.

In the first intermediate heat exchanger (2-1) and in the first downstream heat exchanger (4-1), heat is transferred in each case from synthesis gas D and/or from synthesis gas H to water or to steam, preferably forming high-pressure steam >100 bara, but at least 20 bara steam. For this purpose, water/steam is introduced into the first intermediate heat exchanger (2-1) and any second intermediate heat exchanger present or into the first downstream heat exchanger (4-1) and any second downstream heat exchanger present, which has preferably been heated beforehand.

In a preferred embodiment, the apparatus of the invention further comprises:
1. means of recycling at least a portion of the synthesis gas H from the first downstream heat exchanger to the first reaction apparatus.

The means of recycling at least a portion of the synthesis gas H from the first downstream heat exchanger (4-1) to the first reaction apparatus (1) preferably comprise suitable pipelines, the configuration of which is known to a person skilled in the art.

In a preferred embodiment, the apparatus of the invention further comprises:
(J) means of heating the water and/or steam which is passed into the first intermediate heat exchanger (2-1) and any second intermediate heat exchanger present and/or into the first downstream heat exchanger (4-1) and any second downstream heat exchanger present to form steam.

Preferably, the amount of water and steam and the temperature for each heat exchanger can be regulated independently of one another.

If a first preliminary heat exchanger (1-1) is used in the process of the invention, it is preferably also used and correspondingly configured to cool synthesis gas D.

If a second preliminary heat exchanger (3-1) is used in the process of the invention, it is preferably also used and correspondingly configured to cool synthesis gas F.

In a preferred embodiment,
ii. the first reaction apparatus comprises at least two catalyst beds, i.e. the first catalyst bed (1-A) and the second catalyst bed (1-B), and optionally additionally a third catalyst bed (1-C); and
iii. the second reaction apparatus comprises at least two catalyst beds, i.e. a third catalyst bed (3-A) and a fourth catalyst bed (3-B), and optionally additionally at least one further catalyst bed (3-C).

In the simplest preferred embodiment,
iv. the first reaction apparatus (1) comprises exactly two catalyst beds, i.e. the first catalyst bed (1-A) and the second catalyst bed (1-B); and v. the second reaction apparatus (2) comprises exactly two catalyst beds, i.e. the third catalyst bed (3-A) and the fourth catalyst bed (3-B).

In another preferred embodiment, vi. the first reaction apparatus (1) comprises exactly two catalyst beds, i.e. the first catalyst bed (1-A) and the second catalyst bed (1-B); and vii. the second reaction apparatus (3) comprises at least two catalyst beds, i.e. the third catalyst bed (3-A) and the fourth catalyst bed (3-B) and optionally additionally a further (fifth) catalyst bed (3-C).

In another preferred embodiment, viii. the first reaction apparatus (1) comprises at least two catalyst beds, i.e. the first catalyst bed (1-A) and the second catalyst bed (1-B), and optionally additionally at least one further (third) catalyst bed (1-C); and ix. the second reaction apparatus (3) comprises exactly two catalyst beds, i.e. a fourth catalyst bed (3-A) and a fifth catalyst bed (3-B).

In a preferred execution variant of the apparatus of the invention, the first heat exchanger (1-2) is arranged in the first reaction apparatus such that the fresh synthesis gas A flows through it first before it enters the first catalyst bed (1-A) and then the synthesis gas B comprising product and unconverted reactants which leaves the first catalyst bed (1-A) preferably flows through it in countercurrent after leaving the first catalyst bed (1-A) and before entering the second catalyst bed (1-B).

In a preferred execution variant of the apparatus of the invention, in addition, the third heat exchanger (3-2) is disposed in the second reaction apparatus (3) such that the synthesis gas D leaving the first reaction apparatus (1) flows through it first before it enters the third catalyst bed (3-A), and that the synthesis gas leaving the third catalyst bed (3-A), comprising product and unconverted reactants, preferably flows through it in countercurrent after leaving the third catalyst bed (3-A) and before entering the fourth catalyst bed (3-B).

Figure 1:
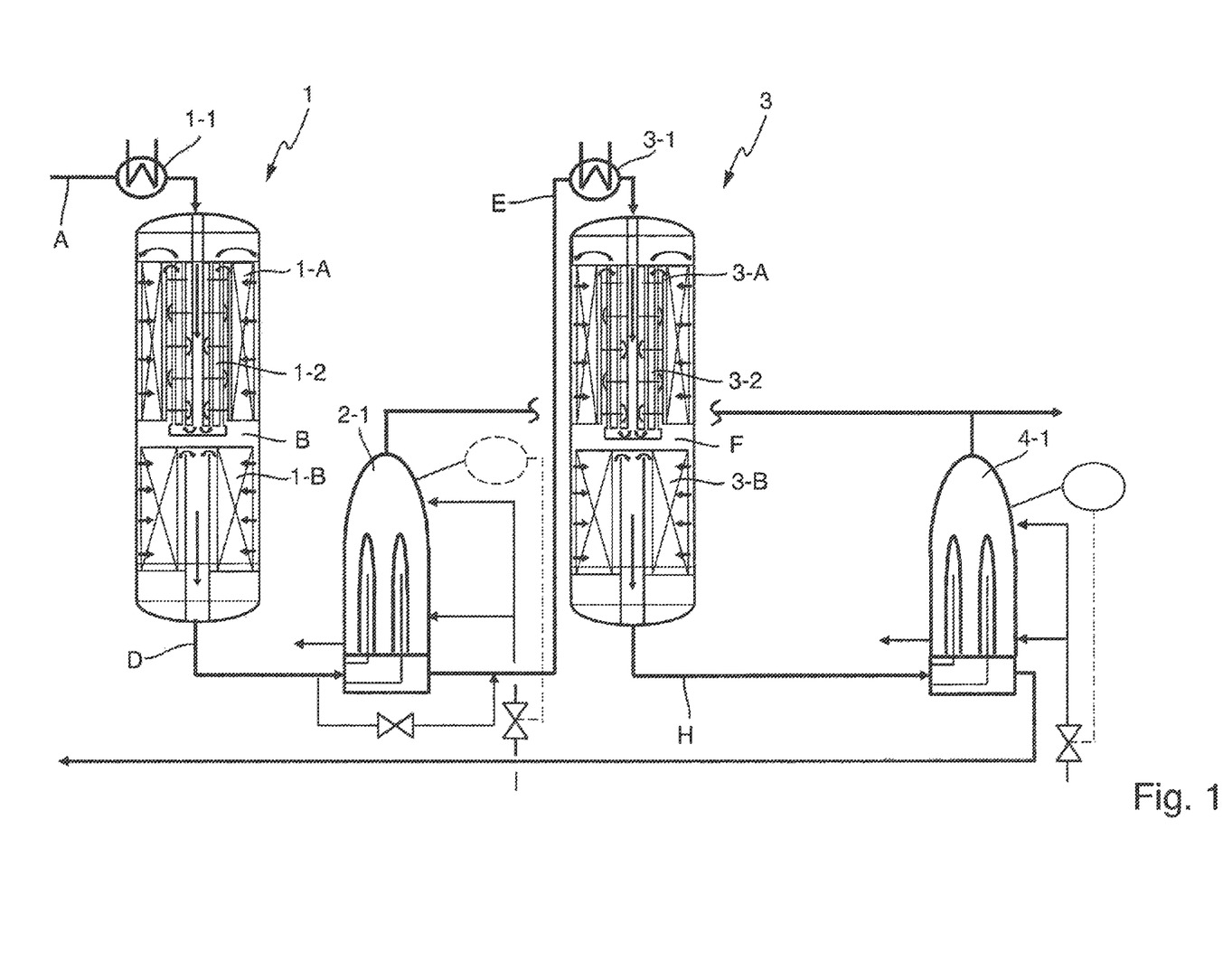
FIG. 1 is a schematic view of a plant in a first working example of the invention, with the aid of which a process preferred can be performed.

The execution variant shown in FIG. 1 shows a plant of the invention with two reaction apparatuses (1), (2), each of which contains two catalyst beds, such that the plant comprises a total of four catalyst beds. A fresh synthesis gas A comprising reactants and optionally inert components is introduced into a first reaction apparatus (1) comprising a first catalyst bed (1-A) and a second catalyst bed (1-B), and a first heat exchanger (1-2). Before the fresh synthesis gas A passes into the first reaction apparatus (1), it can also flow through a preliminary heat exchanger (1-1) connected upstream in the feed. Thereafter, the fresh synthesis gas A is heated in the first reaction apparatus (1) in the first heat exchanger (1-2). Subsequently, the heated fresh synthesis gas A is passed through the first catalyst bed (1-A) to form a synthesis gas B comprising product and unconverted reactants.

As can be seen in FIG. 1, the first heat exchanger (1-2) is arranged such that it is radially within the first catalyst bed (1-A). In other words, catalyst bed (1-A) is in annular form, is radially on the outside of the first reaction apparatus (1) and surrounds the first heat exchanger (1-2) in a ring. The first catalyst bed (1-A) and the heat exchanger (1-2) concentrically within it are of about the same axial length and each extend only over an upper portion of the axial length of the first reaction apparatus (1).

In detail, the flow pathway of the fresh synthesis gas A is as follows. First of all, the fresh synthesis gas A passes into a straight tube of the first heat exchanger (1-2), which extends centrally, for instance in axial direction, within the upper region in the first reaction apparatus (1), and the fresh synthesis gas A flows through it from the top downward. At the lower end, the flow direction is reversed and the fresh synthesis gas flows back upward through the tubes in the first heat exchanger (1-2), where it then flows radially outward in the direction of the arrows above the first heat exchanger, in order then to flow through the first catalyst bed (1-A) radially from the outside inward, where the catalytic reaction takes place. Thereafter, the synthesis gas which has been heated by the reaction flows into the radially inward first heat exchanger (1-2). The synthesis gas is guided here in such a way that the flow through the heat exchanger is from the top downward, and it is cooled since exchange of heat takes place with the cooler fresh synthesis gas A which is likewise flowing through the first heat exchanger. Then the synthesis gas leaves the first heat exchanger (1-2) at the lower end, in order to flow radially outward again below the first heat exchanger.

As a result, it enters the second catalyst bed (1-B), arranged downstream of the first catalyst bed (1-A) in the first reaction apparatus (1), again from the radial exterior in the direction of the arrows. The synthesis gas B cooled in the first heat exchanger (1-2) then flows radially through the second catalyst bed (1-B) from the outside inward in the direction of the horizontal arrows to form a synthesis gas D comprising product and unconverted reactants. In the radially inner region, in the upper region of the second catalyst bed (1-B), the horizontal flow is deflected to a vertical flow, such that the synthesis gas D, after the reaction, flows downward in the second catalyst bed (1-B) in the direction of the large middle arrow and exits from the first reaction apparatus (1) at the lower end. No further heat exchanger is assigned to the second catalyst bed (1-B) within the first reaction apparatus (1), and so the second catalyst bed (1-B) can have a greater radial extent than the first catalyst bed and more volume is correspondingly available for the reaction in the second catalyst bed (1-B).

After discharge from the first reaction apparatus (1), at least a portion of the synthesis gas D is passed through a first intermediate heat exchanger (2-1) and cooled in the process. Boiler feed water that has been heated beforehand preferably flows through the first intermediate heat exchanger (2-1). In the first intermediate heat exchanger (2-1), heat is transferred from the synthesis gas D to the boiler feed water to form high-pressure steam (5).

The cooled synthesis gas E is subsequently introduced into a second reaction apparatus (3) comprising a third catalyst bed (3-A) and a fourth catalyst bed (3-B), and a third heat exchanger (3-2). First of all, the synthesis gas E is heated in the third heat exchanger (3-2). Subsequently, the heated synthesis gas E is passed through the third catalyst bed (3-A) to form a synthesis gas F comprising product and unconverted reactants. The construction of the third catalyst bed (3-A) and of the heat exchanger (3-2) assigned thereto are in principle analogous to the conditions with regard to the first catalyst bed (1-A) and the first heat exchanger (1-2) assigned thereto. This is likewise applicable to the spatial arrangement and the flow conditions of the synthesis gas as already elucidated above. The third heat exchanger (3-2) is thus concentric within the third catalyst bed (3-A) and the synthesis gas E flows through it twice, namely firstly on entry of the synthesis gas E into the second reaction apparatus (3) for heating thereof and also after the reaction in the third catalyst bed for cooling, in order to remove the heat formed in the reaction in the catalyst bed.

The synthesis gas F, after exiting from the third heat exchanger (3-2) and being cooled therein, is subsequently passed through the fourth catalyst bed (3-B) to form a synthesis gas H comprising product and unconverted reactants. Just as in the case of the second catalyst bed (1-B), no further heat exchanger within the reaction apparatus (3) is assigned directly to the fourth catalyst bed (3-B) and it therefore a greater radial extent than the third catalyst bed (3-A). The arrangement and flow conditions correspond to those as described above for the second catalyst bed (1-B), and the synthesis gas H leaves the second reaction apparatus (3) in axial direction at the lower end as indicated by the arrow in FIG. 1.

After leaving the second reaction apparatus (3), at least a portion of the synthesis gas H is passed through a first downstream heat exchanger (4-1) and cooled in the process. Boiler feed water that has been heated beforehand preferably flows through the first downstream heat exchanger (4-1). In the first downstream heat exchanger (4-1), heat is transferred from the synthesis gas H to the boiler feed water to form high-pressure steam (5).

Figure 2:
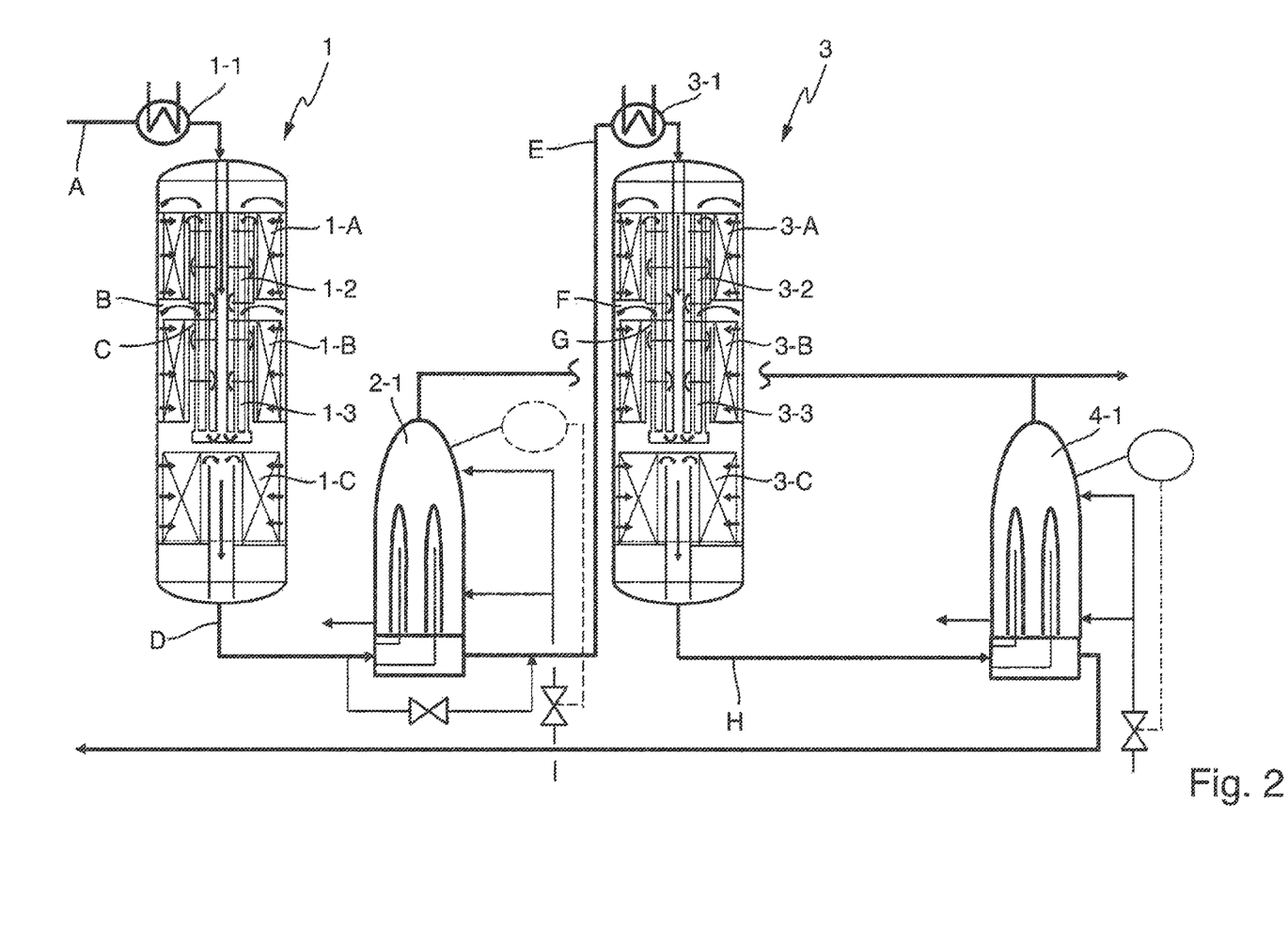
FIG. 2 is a schematic view of a plant in an alternative working example of the present invention.

There follows a description, with reference to FIG. 2, of an alternative working example of the present invention. Unlike in the above-described plant variant, in this variant, three catalyst beds are provided in each of the two reaction apparatuses (1), (3), such that a total of six catalyst beds are present. These are catalyst beds (1-A), (1-B) and (1-C) in the first reaction apparatus, which are arranged successively in flow direction of the process gas stream in the first reaction apparatus (1) and which each follow on axially from one another in a reaction apparatus (1), for instance a cylindrical reaction apparatus as here. Heat exchangers (1-2), (1-3) are assigned in each case to the first catalyst bed (1-A) and the second catalyst bed (1-B), which, as already described above with reference to FIG. 1, are each arranged concentrically within the respective catalyst beds (1-A, 1-B), and through which the process gas flows in the manner described above. The third catalyst bed (1-C) in the first reaction apparatus (1), by contrast, does not have any heat exchanger assigned thereto and can have correspondingly more catalyst volume since it extends further radially inward.

Three catalyst beds (3-A), (3-B) and (3-C) are likewise provided here in the second reaction apparatus (3), which are arranged successively in flow direction of the process gas stream in the second reaction apparatus (3) and which each follow on axially from one another in a reaction apparatus (3), for instance a cylindrical reaction apparatus as here. Heat exchangers (3-2), (3-3) are assigned here in each case to the fourth catalyst bed (3-A) and fifth catalyst bed (3-B) in total, which, as already described with reference to FIG. 1, are each arranged concentrically within the respective catalyst beds (3-A, 3-B), and through which the process gas flows in the manner described above. The third catalyst bed (3-C) in the second reaction apparatus (3), by contrast, does not have a heat exchanger assigned thereto and can correspondingly have more catalyst volume since it extends further radially inward.

In this variant, a synthesis gas C exits from the second catalyst bed, and a synthesis gas stream D leaves the first reaction apparatus (1) downstream of the third catalyst bed (1-C). A synthesis gas E enters the second reaction apparatus (3), the synthesis gas leaving the fourth catalyst bed (3-A) is labeled F, a synthesis gas G exits from the fifth catalyst bed (3-B), and the product gas that leaves the second reaction apparatus (3) downstream of the sixth catalyst bed (3-C) is labeled H. The other parts of the plant in the execution variant according to FIG. 2 are analogous to those already described above in the first working example according to FIG. 1, and so reference is made to the remarks therein with regard thereto.

Further possible variants consist of a mixture of the variants mentioned according to FIG. 1 and FIG. 2. In one case, the first reaction apparatus (1) would be executed according to FIG. 2, i.e. with three catalyst beds (1-A), (1-B) and (1-C), and the second reaction apparatus (3) according to FIG. 1 would consist of two catalyst beds, (3-A) and (3-B). In another case, the first reaction apparatus (1) would be configured according to FIG. 2, i.e. with two catalyst beds (1-A) and (1-B), and the second reaction apparatus (3) would consist of three catalyst beds, (3-A), (3-B) and (3-C).

Figure 3:
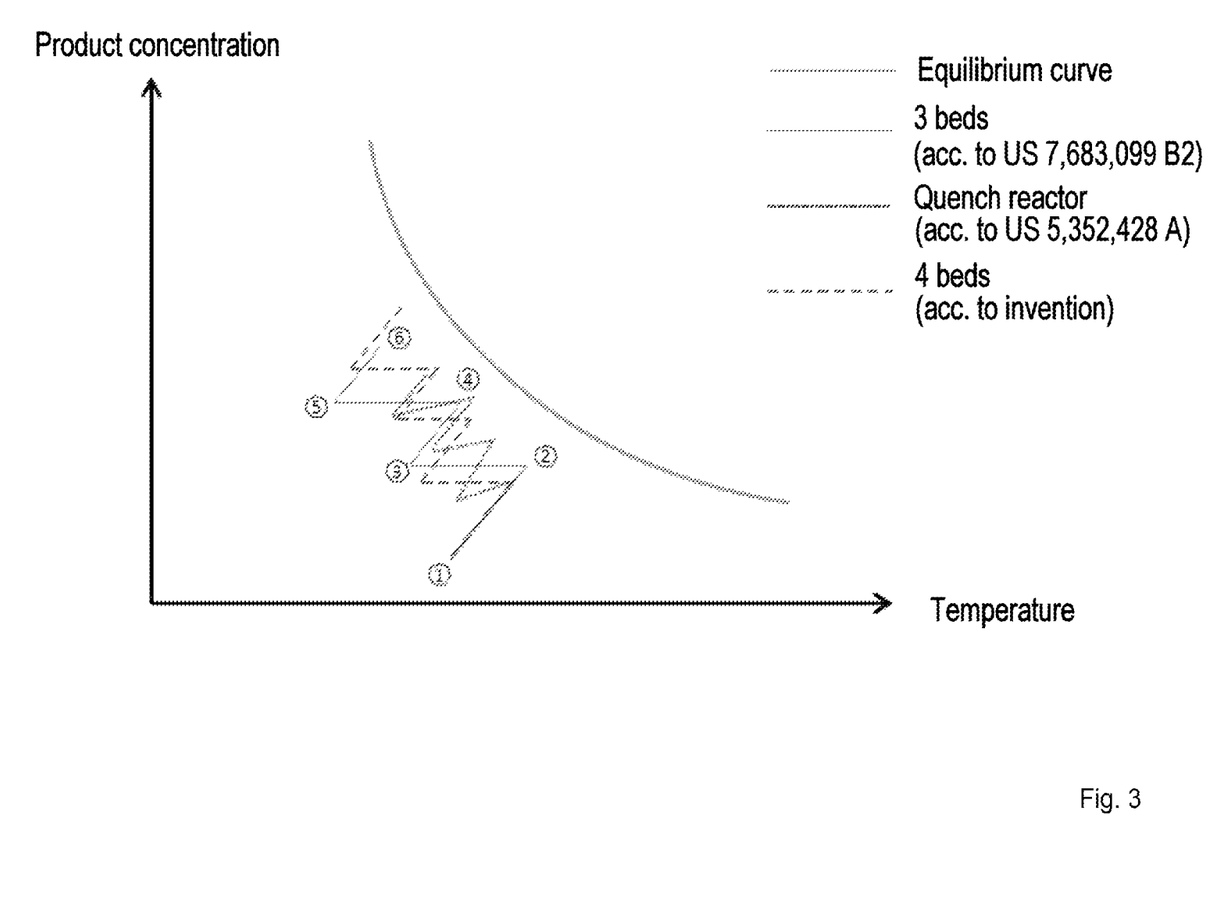
FIG. 3 is a diagram of the various reaction apparatuses according to the prior art.

The diagram at the bottom describes various reaction apparatuses according to the prior art, by comparison with the subject matter of the invention. The representation shows the progression of reaction over several catalyst beds including cooling, or more specifically the correlation between product concentration and reaction temperature versus the reaction equilibrium. All three reactor curves start at the bottom of the diagram at similar temperatures.

The green curve for the three-bed converter starts at point 1, where the exothermic reaction begins; there is a rise in product concentration and temperature. At point 2 the mixture has flowed through the catalyst bed; the reaction stops and the gas is cooled down at constant concentration as far as point 3. Then the gas is passed into the second catalyst bed; there is a rise in concentration and temperature again up to point 4. From point 4 to point 5, the gas is cooled down again in a heat exchanger. In the third catalyst bed, the gas reacts further as far as point 6.

The brown curve for the quench reactor runs analogously to the green curve, except that the intermediate coolings by the quench gas (points 2 to 3 and points 4 to 5) lower not just the temperature but also the concentration as a result of the mixing-in of fresh gas.

The blue curve shows the profile for the 4-bed reactor described in the invention. In this diagram, the curve likewise runs analogously to the other curves. By contrast with the other curves, there are 8 vertices here on the curve, correspondingly as a result of the higher number of beds. It can likewise be inferred from this diagram that the 4-bed reactor produces the highest product concentration at the exit (uppermost point on the curve), and hence has distinct advantages over the other reactor types.

The invention claimed is:

1. A method for preparing ammonia from a synthesis gas A under heterogeneous gas catalysis in at least a first reaction apparatus series-connected to a second reaction apparatus, the first reaction apparatus comprising at least a first catalyst bed and a second catalyst bed, and a first heat exchanger disposed between the first and second catalyst beds, comprising:
   passing the synthesis gas A through the first catalyst bed and the second catalyst bed to at least partially convert the synthesis gas A to synthesis gas B,
   preheating the fresh synthesis gas A in the first heat exchanger,
   cooling the synthesis gas B comprising ammonia and unconverted reactants that exits from the first catalyst bed prior to entry into the second catalyst bed,
   providing an intermediate heat exchanger in the flow pathway between the first reaction apparatus and the second reaction apparatus,
   utilizing a gas stream D exiting from the second catalyst bed without prior cooling for one or both of raising of steam in the intermediate heat exchanger and preheating of a boiler feed water in the intermediate heat exchanger, wherein the second reaction apparatus also comprises a third catalyst bed and a fourth catalyst bed through which the gas stream D generated in the first reaction apparatus is passed and in which there is at least partial conversion to ammonia, wherein the gas stream D that exits from the second catalyst bed is cooled in the intermediate heat exchanger below the entry temperature required for the third catalyst bed, in order, in a subsequent step, with the aid of a further heat exchanger which simultaneously serves as an intermediate cooler between the third catalyst bed and the fourth catalyst bed, to bring the gas stream back to a defined process temperature for the third catalyst bed that enables temperature control over all catalyst beds.

2. The method of claim 1, wherein the synthesis gas B leaving the first catalyst bed, prior to entry into the second catalyst bed, is cooled by means of the first heat exchanger which is disposed between the first catalyst bed and the second catalyst bed in the flow pathway of the synthesis gas B comprising a proportion of ammonia.

3. The method of claim 1, wherein all of the fresh synthesis gas A is passed through the first catalyst bed and then also through the second catalyst bed.

4. The method of claim 1, wherein at least a portion of a synthesis gas H which exits from the fourth catalyst bed is circulated and mixed with the fresh synthesis gas A.

5. The method of claim 1, wherein at least one further heat exchanger through which a synthesis gas E entering the third catalyst bed flows in order to preheat it is disposed in the second reaction apparatus between the third catalyst bed and the fourth catalyst bed and simultaneously serves to cool the synthesis gas F entering the fourth catalyst bed.

6. The method of claim 1, wherein all of synthesis gas stream D that exits from the second catalyst bed and comprises a proportion of ammonia is introduced into the third catalyst bed.

7. The method of claim 1, wherein the fresh synthesis gas A is produced by reforming of hydrocarbons, where the reforming is effected in a steam reformer, in a gas-heated reformer, in an autothermal reformer or by partial oxidation, or by electrolysis of water and air fractionation.

8. The method of claim 1, wherein a daily production of ammonia exceeds 1800 t, preferably of 2500, more preferably 3000 t.

* * * * *